United States Patent [19]
Noguchi et al.

[11] Patent Number: 5,292,597
[45] Date of Patent: Mar. 8, 1994

[54] MAGNETIC RECORDING MEDIUM

[75] Inventors: Hitoshi Noguchi; Shinji Saito; Hiroshi Ogawa, all of Kanagawa, Japan

[73] Assignee: Fuji Photo Film Co., Ltd., Kanagawa, Japan

[21] Appl. No.: 777,147

[22] Filed: Oct. 16, 1991

[30] Foreign Application Priority Data

Oct. 17, 1990 [JP] Japan ................. 2-276391

[51] Int. Cl.$^5$ .................... B32B 5/16; G11B 5/66
[52] U.S. Cl. .................... 428/694 B; 428/329; 428/694 BA; 428/694 BM; 428/900
[58] Field of Search .............. 428/329, 694, 900, 403, 428/694 B, 694 BA, 694 BM; 360/131; 369/280

[56] References Cited

U.S. PATENT DOCUMENTS

| | | | |
|---|---|---|---|
| 4,200,680 | 4/1980 | Sasazawa et al. | 428/900 |
| 4,784,895 | 11/1988 | Mizuno et al. | 428/694 |
| 4,851,289 | 7/1989 | Ogawa et al. | 428/329 |
| 4,992,330 | 2/1991 | Kawahara et al. | 428/329 |
| 5,051,303 | 9/1991 | Noguchi et al. | 428/329 |

*Primary Examiner*—Paul J. Thibodeau
*Assistant Examiner*—Leszek Kiliman
*Attorney, Agent, or Firm*—Sughrue, Mion, Zinn Macpeak & Seas

[57] ABSTRACT

A magnetic recording medium having excellent electromagnetic characteristics and well adapted for video use, which comprises a non-magnetic support having provided thereon at least two magnetic layers each comprising a ferromagnetic powder and a binder resin, wherein the uppermost magnetic layer arranged farthest from the support contains a cobalt-containing iron oxide powder having an $Fe^{2+}/Fe^{3+}$ mole ratio of 20/100 to 50/100 and a coercive force of 650 to 1,500 Oe, and at least one of said magnetic layers is a lower magnetic layer in contact with the uppermost magnetic layer and contains a cobalt-containing iron oxide powder having an $Fe^{2+}/Fe^{3+}$ mole ratio of less than 20/100 and a coercive force of 0.6 to 1.0 times that of the cobalt-containing iron oxide powder contained in the uppermost magnetic layer.

13 Claims, No Drawings

MAGNETIC RECORDING MEDIUM

FIELD OF THE INVENTION

The present invention relates to a magnetic recording medium having at least two magnetic layers provided on a non-magnetic support, and particularly to a magnetic recording medium well adapted for video use of the VHS system or the $\beta$ system.

BACKGROUND OF THE INVENTION

In recent years, with the development of magnetic recording systems, there is a demand for higher image quality and sound quality, particularly for magnetic tapes for video use. In order to meet these needs, the particle size of ferromagnetic powders has been decreased, and the density of magnetic recording media has been increased.

Furthermore, with consumption of magnetic recording media in large quantities, it is desirable to produce the recording media at lower cost. One means for reducing the production cost of magnetic recording media is to provide a plurality of magnetic layers. In this case, an upper magnetic layer is designed to provide good image quality, and a lower magnetic layer is designed to provide good sound quality. Since the above noted functions can thus be separated into the upper and lower layers, a ferromagnetic powder also favorable from a cost aspect can be used. Also, appropriate materials other than the ferromagnetic powder can be suitably selected to minimize production cost.

On the other hand, in order to achieve high image quality and sound quality for a magnetic tape for video use, an increased reproduced output and reduced modulation noise is required to improve S/N. For this purpose, appropriate selection of the electromagnetic characteristics of the ferromagnetic powder is important. For example, regarding the above-described magnetic recording media having a plurality of magnetic layers, it is necessary to increase the loading of the ferromagnetic powder and to reduce the particle size of the ferromagnetic powder to provide an improvement in output and a reduction in noise in the upper magnetic layer for good image quality. Furthermore, in the lower magnetic layer, it is necessary to optimize the coercive force in consideration of linear audio characteristics and also video characteristics, particularly with respect to maintaining chroma output.

However, conventional plural-layer magnetic recording media for video use have a low residual magnetic flux density of the upper magnetic layers, such that the video output and S/N are insufficient. Furthermore, the coercive force of the upper magnetic layer is not necessarily optimally matched to that of the lower magnetic layer. For this reason, the chroma output and S/N and linear audio frequency characteristics are not sufficient.

On the other hand, with respect to the ferromagnetic powder used in the magnetic layers, ferromagnetic metal powders, barium ferrite and the like have excellent magnetic characteristics, and are advantageous for high density recording. However, these ferromagnetic powders are expensive and have poor storage stability. Furthermore, it is difficult to disperse these ferromagnetic powders in a binder such that their potentially good performance is not always realized. Ferromagnetic oxide powders have few problems in this regard and therefore practically advantageous. Investigators have sought to further improve the characteristics of ferromagnetic oxide powders.

In particular, of the ferromagnetic iron oxide powders, cobalt-containing iron oxide powders exhibit excellent magnetic characteristics, and iron oxide powders having various characteristics are proposed (for example, in JP-B-48-39639 (the term "JP-B" as used herein means an "examined Japanese patent publication"), JP-A-51-36596 (the term "JP-A" as used herein means an "unexamined published Japanese patent application"), JP-A-51-38079 and JP-A-51-16905).

Magnetic recording media utilizing the features of a plural magnetic layer structure and using cobalt-containing iron oxide as the ferromagnetic powder are proposed, for example, in JP-A-1-220218, wherein cobalt-modified iron oxide having a mean length in the long axis direction of 0.27 to 0.35 $\mu$m, an $Fe^{2+}/Fe^{3+}$ mole ratio of 1/100 to 2.6/100 and a coercive force of 360 to 440 Oe is used in the lower layer, and cobalt-modified iron oxide having a mean length in the long axis direction of 0.17 to 0.27 $\mu$m, an $Fe^{2+}/Fe^{3+}$ mole ratio of 5.0/100 to 6.5/100 and a coercive force of 550 to 720 Oe is used in the upper layer.

In the invention disclosed in JP-A-1-220218, the ferromagnetic powder contained in the lower layer is designed to smooth the magnetic layer by decreasing the particle size and to improve print-through characteristics by reducing the proportion of $Fe^{2+}$, and the ferromagnetic powder contained in the upper layer is designed to heighten the output through a reduction in noise by further decreasing the particle size and to improve susceptibility by increasing the proportion of $Fe^{2+}$. However, the invention disclosed in JP-A-220218 concerns a magnetic tape for audio use. This tape is still inadequate for a video tape of the VHS system or the $\beta$ system in terms of the coercive force of the ferromagnetic powder and the particle size.

Namely, when the magnetic recording medium disclosed in JP-A-220218 is used for a video application, the video output and S/N are decreased because the coercive force of the ferromagnetic powder contained in the upper layer is as low as 550 to 720 Oe, the mean length in the long axis direction is as large as 0.17 to 0.27 $\mu$m and the $Fe^{2+}/Fe^{3+}$ mole ratio is as low as 5.0/100 to 6.5/100. Furthermore, the linear audio frequency characteristics are lower than the VHS standard, because the coercive force of the ferromagnetic powder contained in the lower layer is as low as 360 to 440 Oe.

SUMMARY OF THE INVENTION

An object of the present invention is to provide a magnetic recording medium having excellent electromagnetic characteristics, particularly video characteristics and linear audio characteristics, which magnetic recording medium is well adapted for video use of the VHS system or the $\beta$ system.

The present inventors have discovered that the above-described object of the present invention is attained by a magnetic recording medium comprising a non-magnetic support having provided thereon at least two magnetic layers, wherein said at least two magnetic layers comprise a ferromagnetic powder and a binder resin; the uppermost magnetic layer arranged farthest from the support contains a cobalt-containing iron oxide powder having an $Fe^{2+}/Fe^{3+}$ mole ratio of 20/100 to 50/100 and a coercive force of 650 to 1,500 Oe; and at least one of said magnetic layers is a lower magnetic layer in contact with the uppermost magnetic layer and contains a cobalt-containing iron oxide powder having an $Fe^{2+}/Fe^{3+}$ mole ratio of less than 20/100 and a coercive force of from 0.6 to 1.0 times that of the cobalt-containing iron oxide powder contained in the uppermost magnetic layer.

DETAILED DESCRIPTION OF THE PRESENT INVENTION

The magnetic recording medium disclosed in JP-A-1-220218 described above is a magnetic recording medium suitable for audio applications. Another object of JP-A-1-220218 is to provide a magnetic recording medium such as a magnetic tape having good output over a wide range of audio frequencies, low bias noise and high sensitivity. In particular, specific objects are to provide a magnetic recording medium which does not exhibit a decrease in output in the middle band, a magnetic recording medium having increased maximum output level (MOL) in the high band, and to further increase the MOL in the middle and low or middle band.

In contrast, the present invention relates to a magnetic recording medium for video applications, and the main objectives of the present invention are to improve the video output, chroma output and S/N, and to improve the print-through characteristics and linear audio frequency characteristics.

For this reason, although the present invention is somewhat similar to JP-A-1-220218 in constitution, the present invention is different from JP-A-1-220218 in the specified ranges of the magnetic characteristics and the $Fe^{2+}/Fe^{3+}$ mole ratio, which differences relate to achieving to objectives of the present invention.

Namely, in order to obtain a video tape which provides for high density recording, the cobalt-containing ferromagnetic iron oxide powder having a relatively high saturation magnetization ($\sigma s$) and a high $Fe^{2+}/Fe^{3+}$ mole ratio (specified range: 20/100 to 50/100) is used in the uppermost magnetic layer, and the coercive force thereof also has a relatively high specified value of 650 to 1,500 Oe. On the other hand, in order to improve the print-through which is a disadvantage of the above-described ferromagnetic iron oxide powder having the high $Fe^{2+}/Fe^{3+}$ mole ratio, the cobalt-containing ferromagnetic iron oxide powder having a low $Fe^{2+}/Fe^{3+}$ mole ratio which to a large extent does not adversely affect print-through is used in the lower layer. Furthermore, to provide a higher recording density, the coercive force of the uppermost magnetic layer is established higher than that of the lower magnetic layer. The present invention is thus characterized as described above.

The present invention solves the problems of a conventional plural-layer video tape. Namely, the video output, chroma output and S/N are improved, and the print-through characteristics and linear audio frequency characteristics are improved.

The present invention is described below in more detail.

The magnetic recording medium of the present invention comprises at least two magnetic layers each magnetic layer of which comprising a ferromagnetic powder and a binder resin provided on a non-magnetic support. The magnetic recording medium may comprise two three or more magnetic layers.

The magnetic recording medium of the present invention must have at least two magnetic layers, namely, the magnetic layer arranged farthest from the support (hereinafter referred to as the "uppermost" magnetic layer), and the magnetic layer adjacent and in direct contact with the uppermost magnetic layer and arranged closer to the support than the uppermost magnetic layer (hereinafter referred to as "lower magnetic layer" or "lower layer"). One or more additional magnetic layers may be interposed between the lower magnetic layer and the support, if desired.

In the present invention, the uppermost magnetic layer contains a cobalt-containing iron oxide powder having an $Fe^{2+}/Fe^{3+}$ mole ratio of 20/100 to 50/100, and preferably of 25/100 to 35/100, as the ferromagnetic powder. If the $Fe^{2+}/Fe^{3+}$ mole ratio is less than 20/100, the saturation magnetization ($\sigma s$) of the ferromagnetic powder is unfavorably decreased, the packing density of the ferromagnetic powder of the tape is reduced, and the output is also lowered. If the $Fe^{2+}/Fe^{3+}$ mole ratio exceeds 50/100, the print-through characteristics can not be measured.

That is, if the $Fe^{2+}/Fe^{3+}$ mole ratio exceeds 50/100, the powder can not be synthesized because the ratio is outside of the stoichiometric range (at an $Fe^{2+}/Fe^{3+}$ mole ratio of 50/100, magnetite $Fe_2O_3 = FeO \cdot Fe_2O_3$).

The cobalt-containing iron oxide powder for use in the uppermost magnetic layer has a coercive force of 650 to 1,500 Oe {preferably 750 to 950 Oe} and a specific surface area ($S_{BET}$) of generally 25 m$^2$/g or more (preferably 30 to 70 m$^2$/g and particularly preferably 35 to 60 m$^2$/g). If the coercive force is less than 650 Oe, the output in the high band is poor. On the other hand, if the coercive force exceeds 1,500 Oe, the output in the low band is remarkably decreased.

The amount of the binder which is used in the uppermost magnetic layer is generally 100 to 300 g and preferably 200 to 270 g per 1 kg of the ferromagnetic powder.

When the magnetic recording medium of the present invention is used as a magnetic recording medium for video use (for example, a magnetic recording medium used in the VHS or $\beta$ system), the uppermost magnetic layer effects the characteristics of image quality. The reproduced video output, reproduced chroma output and HiFi output are improved by using the cobalt-containing iron oxide powder having an $Fe^{2+}/Fe^{3+}$ mole ratio of 20/100 to 50/100 and a coercive force of 650 to 1,500 Oe in the uppermost magnetic layer. In particular, the reproduced video output is significantly improved.

The lower magnetic layer of the present invention contains a cobalt-containing iron oxide powder having an $Fe^{2+}/Fe^{3+}$ mole ratio of less than 20/100 and a coercive force of 0.6 to 1.0 time that of the cobalt-containing iron oxide powder contained in the uppermost magnetic layer, as the ferromagnetic powder. Further, the cobalt-containing iron oxide powder which is used in the lower magnetic layer has a specific surface area ($S_{BET}$) of generally 20 to 50 m$^2$/g and preferably 25 to 45 m$^2$/g.

It is preferred that the coercive force of the cobalt-containing iron oxide powder of the lower magnetic layer is 0.8 to 1.0 times that of the uppermost magnetic layer. In particular, it is most preferred that the coercive force of the cobalt-containing iron oxide powder in the lower magnetic layer is 600 to 850 Oe.

If the coercive force of the cobalt-containing iron oxide powder contained in the lower magnetic layer exceeds 1.0 times that of the uppermost magnetic layer, the electromagnetic characteristics in the long wavelength region are decreased. If the coercive force of the lower magnetic layer is less than 0.6 times that of the uppermost magnetic layer, the linear audio frequency characteristics are deteriorated.

The amount of the binder which is used in the lower magnetic layer is generally 100 to 300 g and preferably 200 to 270 g per 1 kg of the ferromagnetic powder.

The $Fe^{2+}/Fe^{3+}$ mole ratio of the cobalt-containing iron oxide powder for use in the lower magnetic layer is less than 20/100, and preferably from 5/100 to 10/100. If the $Fe^{2+}/Fe^{3+}$ mole ratio is 20/100 or more, the print-through characteristics are unfavorably deteriorated.

When the magnetic recording medium of the present invention is used as a magnetic recording medium for video use, the lower magnetic layer mainly effects the characteristics of tone quality. The linear audio characteristics, print-through characteristics and reproduced chroma output are improved by using the cobalt-containing iron oxide powder having an $Fe^{2+}/Fe^{3+}$ mole ratio of less than 20/100 and a coercive force of 0.6 to 1.0 times that of the uppermost magnetic layer in the lower magnetic layer. In particular, the linear audio characteristics are significantly improved.

Thus, in the present invention, the coercive force and the $Fe^{2+}/Fe^{3+}$ mole ratio of the uppermost magnetic layer is increased, whereby the saturation magnetization (σs) and reproduced video output are improved. As to the lower magnetic layer, the $Fe^{2+}/Fe^{3+}$ mole ratio is decreased, whereby the deteriorated print-through characteristics of the uppermost magnetic layer are compensated for to improve the print-through characteristics of the magnetic recording medium as a whole. Moreover, the video output is compatible with the chroma output by increasing the coercive force of the uppermost magnetic layer and by decreasing that of the lower magnetic layer.

The particle size of the cobalt-containing iron oxide powder for use in the uppermost magnetic layer preferably has a mean length in the long axis direction of 0.25 μm or less, more preferably from 0.06 to 0.25 μm, and most preferably 10 to 0.20 μm. The crystallite size is preferably not more than 500 Å, and more preferably 200 to 360 Å. If the mean length in the long axis direction exceeds 0.25 μm, or if the crystallite size exceeds 500 Å, the noise is unfavorably increased. If the mean length in the long axis direction is less than 0.10 μm, the dispersibility and squareness ratio are reduced, which results in deterioration of the electromagnetic characteristics.

The cobalt-containing iron oxide powder used in the lower magnetic layer preferably has a mean length in the long axis direction ranging generally 0.25 μm or less (preferably 0.10 to 0.25 μm) and is larger than that of the cobalt-containing iron oxide powder contained in the uppermost magnetic layer. Furthermore, it is preferred that the crystallite size of the cobalt-containing iron oxide powder used in the lower magnetic layer is 500 Å or less, but larger than that of the cobalt-containing iron oxide powder used in the uppermost magnetic layer. More preferably, the mean length in the long axis direction of the cobalt-containing iron oxide powder of the lower layer is generally 0.25 μm or less (preferably 0.10 to 0.25 μm), and the crystallite size thereof is 300 to 450 Å. If the mean length in the long axis direction exceeds 0.25 μm, or if the crystallite size exceeds 500 Å, the surface properties are unfavorably deteriorated. Furthermore, if the mean length in the long axis direction is less than 0.10 μm, the powder is not sufficiently dispersed, thereby unfavorably deteriorating the surface properties.

The surface of the magnetic layer is smoothened and the noise is reduced by employing a particle size of the cobalt-containing iron oxide powder in the uppermost and lower magnetic layers within the above-described range.

Furthermore, the dry thickness of the uppermost magnetic layer is preferably from 0.1 to 1.5 μm, and more desirably 0.1 to 0.5 μm. The dry thickness of the lower magnetic layer is preferably 2.0 to 6.0 μm, and more preferably 2.5 to 5.0 μm.

In particular, the print-through characteristics are preferably improved by employing a lower magnetic layer having a dry thickness of 2.0 μm or more, preferably 2.5 μm or more.

In the present invention, to improve the reproduced video output, the coercive force and the $Fe^{2+}/Fe^{3+}$ mole ratio of the uppermost magnetic layer are increased to improve the saturation magnetization (σs). However, when the coercive force of the upper layer is thus increased, the "print-through" effect is increased such that a signal recorded on a first magnetic layer overlaps a signal recorded on a second magnetic layer by leakage of the magnetic field of the magnetic layers between adjacent tapes stored in roll form. When reproduced, the thus transferred signal (i.e., print-through signal produces noise to deteriorate the quality of the recorded signal. Generally, in the lower magnetic layer, the ferromagnetic powder having a low coercive force as compared with that of the uppermost magnetic layer is used in view of the electromagnetic characteristics in the low band, and thereby the print-through characteristics is further deteriorated.

Therefore, in the layer constitution of the present invention, the uppermost magnetic layer uses a ferromagnetic power having an excellent electromagnetic characteristics but a poor print-through characteristics and the lower magnetic layer uses a ferromagnetic powder having an excellent print-through characteristics but a poor electromagnetic characteristics. That is, the present invention is to improve deterioration of the print-through characteristics by using the ferromagnetic powder having a low coercive force in the lower magnetic layer.

Methods for producing the cobalt-containing iron oxide powders for use in the present invention are known in the art. For example, the cobalt-containing iron oxide powder may be prepared by the following method which is described in U.S. Pat. Nos. 4,200,680, 4,267,207, 4,066,565 and 4,125,474.

First, γ-Fe₂O₃ is dispersedin water, and CoSO₄ and FeSO₄ are added thereto. NaOH is further added thereto to make the dispersion basic, followed by heating. Then, the resulting surface-treated γ-Fe₂O₃ is washed with water, and dried by heating in a nitrogen gas, thereby obtaining Co- and Fe-modified γ-Fe₂O₃. During the above-described procedure, the $Fe^{2+}/Fe^{3+}$ mole ratio is adjusted by varying the ratio of CoSO₄ to FeSO₄ and the amounts thereof.

The magnetic recording media of the present invention can be prepared, for example, in the following manner.

The non-magnetic support for use in the present invention is selected, for example, from films or sheets formed of polyesters such as polyethylene terephthalate (PET) and polyethylene naphthalate, polyolefins such as polypropylene, cellulose derivatives such as cellulose triacetate and cellulose diacetate, vinyl resins such as polyvinyl chloride and polyvinylidene chloride, and synthetic resins such as polycarbonates, polyamides, polyamideimides and polyimides; foils of non-magnetic metals such as aluminum and copper; metal foils such as stainless steel foils; paper; and ceramic sheets.

There is no particular limitation for the thickness of the non-magnetic support. However, the thickness is generally from 2.5 to 100 $\mu$m, and preferably from 3 to 80 $\mu$m.

The magnetic layer of the magnetic recording medium of the present invention is a layer comprising the ferromagnetic powder and a binder resin in which the ferromagnetic powder is dispersed. The ferromagnetic powder for use in the present invention is the cobalt-containing iron oxide powder. However, other ferromagnetic powders may be used in combination therewith, if desired. Examples of such other ferromagnetic powders include known ferromagnetic powders such as $\gamma$-$Fe_2O_3$, $Fe_3O_4$, Co-containing $Fe_3O_4$, $CrO_2$, Co-Ni-P alloys and Fe-Co-Ni alloys.

A binder solution for preparing a magnetic coating solution for applying onto the nonmagnetic support for use in the present invention contains a resin component and a solvent, and may further contain a lubricating agent and an abrasive agent as required.

Known thermoplastic resins, thermosetting resins, radiation curable resins, reactive resins or mixtures thereof are useful as the binder component. Examples of the binder component include vinyl chloride copolymers (for example, vinyl chloride-vinyl acetate copolymers, vinyl chloride-vinyl acetate-vinyl alcohol copolymers, vinyl chloride-vinyl acetate-acrylic acid copolymers, vinyl chloride-vinylidene chloride copolymers, vinyl chloride-acrylonitrile copolymers, ethylene-vinyl acetate copolymers and vinyl chloride copolymers in which polar groups such as —$SO_3Na$ or —$SO_2N_a$ and epoxy groups are introduced); cellulose derivatives such as nitrocellulose resins; acrylic resins; polyvinyl acetal resins; polyvinyl butyral resins; epoxy resins; phenoxy resins; and polyurethane resins (for example, polyester polyurethane resins, polyurethane resins in which polar groups such as $SO_3Na$ or $SO_2Na$ are introduced, and polycarbonate polyurethane resins).

When a hardeners is to be used, polyisocyanate compounds are generally used. The polyisocyanate compounds are selected from compounds generally employed as hardener components for polyurethane resins and the like.

Furthermore, when hardening treatment is conducted by irradiation with an electron beam, compounds having reactive double bonds (for example, urethane acrylates) can be used.

Examples of the solvents used to prepare the magnetic coating solution include ketones such as acetone, methyl ethyl ketone, methyl isobutyl ketone, ethyl isobutyl ketone and cyclohexanone; esters such as methyl acetate, ethyl acetate, butyl acetate and glycol acetate monoethyl ether; glycol ethers such as ether, glycol dimethyl ether and dioxane; aromatic hydrocarbons such as benzene, toluene and xylene; and chlorinated hydrocarbons such as methylene chloride, ethylene chloride, carbon tetrachloride, chloroform, ethylene chlorohydrin and dichlorobenzene. These solvents can be used alone or in combination. Polar solvents such as ketones or solvents containing the polar solvents are particularly preferable.

The ferromagnetic powder is kneaded with the binder solution to enhance a packing density (a filling degree) of the ferromagnetic powder. Examples of apparatus which are used for the above kneading process include a two-roll mill, a three-roll mill, a kneader, a pressure kneader and a biaxial-screw type continuous kneading mixer. Among these, the biaxial-screw type continuous kneading mixer which can give a high shearing strength to components to be kneaded is preferably used for obtaining a high residual magnetic flux density (i.e., the high residual magnetic flux density required is generally 1200 gauss or more, preferably 1600 gauss or more and particularly preferably 2000 gauss or more), of the magnetic layer.

Subsequently, the obtained mixture of the ferromagnetic powder and binder is further dispersed in a binder solution to obtain the final coating solution to be coated on a non-magnetic support so that the ferromagnetic powder is fined and dispersed homogeneously in the binder solution.

Examples of dispersing apparatus which are used for the above dispersing process include a sand grinder and a ball mill.

Various additives such as abrasive agents, lubricating agents, dispersing agents and antistatic agents may be added, of course, to the magnetic coating solution according to conventional techniques depending on the particular application.

Methods for preparing the magnetic recording medium of the present invention is described below.

The magnetic layers are formed by applying the magnetic coating solutions prepared as described above to the non-magnetic support in the following manner.

First, as the resin component and the ferromagnetic powder for the lower magnetic layer, the above-described specific cobalt-containing iron oxide powder and the magnetic layer-forming components such as the hardener compounded if desired are kneaded with the solvent to disperse these components as described above, to thereby prepare a magnetic coating solution for the lower magnetic layer (a first coating solution for the first magnetic layer).

A coating magnetic solution for the uppermost magnetic layer (a second coating solution for the second coating layer) is also prepared as described above.

A preferred method for preparing the magnetic recording medium of the present invention comprises coating the coating solution for the lower magnetic layer onto the surface of the running non-magnetic support, and then continuously coating the coating solution for the uppermost magnetic layer onto the coated layer which is in a wet state, such that the uppermost magnetic layer having a dry thickness within the range of from 0.1 to 1.5 $\mu$m is formed after drying.

For example, when reverse rolls are used as a coater in the method of forming the lower magnetic layer and the uppermost magnetic layer continuously, two sets of reverse rolls may be installed such that the running non-magnetic support is arranged therebetween to coat the support with the coating solutions, or two sets of reverse rolls may be installed such that they are spaced within the range in which the lower magnetic layer can be maintained in a wet state (namely, a state in which the coated layer still contains the solvent and exhibits adhesion).

Methods which can be used for applying the magnetic coatings include air doctor coating, blade coating, rod coating, extrusion coating, air knife coating, squeeze coating, impregnation coating, transfer roll coating, gravure coating, kiss coating, cast coating, spray coating and spin coating, in addition to reverse roll coating.

The above-described magnetic coatings are generally applied such that the combined thickness of all of the dried magnetic layers of the resulting magnetic recording medium is within the range of from 2.1 to 10 μm (the combined thickness of all of the dried magnetic layers including the uppermost magnetic layer and the lower magnetic layer, and further including additional magnetic layers if present).

A back layer (backing layer) may be formed on the surface of the side of the non-magnetic support opposite that having provided thereon the magnetic coating solutions. Generally, the back layer is a layer formed on the surface of the non-magnetic support opposite that having the magnetic coating solutions, not applied, by applying thereto a back layer-forming coating solution comprising granular components such as an abrasive agent and an antistatic agent, a binder and an organic solvent in which the granular components and the binder are dispersed.

Both surfaces of the non-magnetic support to which the magnetic coating solutions and the back layer-forming coating solution are applied may be provided with an adhesive layer.

Generally, the coated layers of the magnetic coating solutions are subjected to treatment for orienting the ferromagnetic powders contained in the coated layers of the magnetic coating solutions, namely magnetic field orientation treatment, followed by drying.

After drying, the coated magnetic layers are subjected to surface smoothing treatment. In the surface smoothing treatment, for example, supercalender rolls can be employed. Voids produced by removal of the solvent in drying are thereby eliminated, and the packing density of the ferromagnetic powder contained in the magnetic layers is improved by conducting the surface smoothing treatment, such that a magnetic recording medium having excellent electromagnetic characteristics is obtained.

After the surface smoothing treatment is performed as described above, radiation irradiation treatment or heat treatment is suitably carried out for hardening treatment.

Then, the laminate thus subjected to the hardening treatment is cut into the desired shape. The cutting can be conducted by using a conventional cutter such as a slitter under conventional conditions.

According to the present invention, the magnetic recording medium having excellent video characteristics, linear audio characteristics and print-through characteristics, and which is well adapted for video use of the VHS system or the β system, is obtained by using the cobalt-containing iron oxide powder having an $Fe^{2+}/Fe^{3+}$ ratio within the specified range and a coercive force within the specified range in the uppermost magnetic layer and the lower magnetic layer in contact therewith.

The present invention will be described in more detail by reference to the following Examples and Comparative Examples, but the scope of the present invention should not be construed as being limited thereto.

In the following Examples and Comparative Examples, all parts are by weight.

EXAMPLES

Example 1

| Coating Solution for Uppermost Magnetic Layer (Solution A) | |
|---|---|
| Co-γ-FeO$_x$ | 100 parts |
| (x depends on the $Fe^{2+}/Fe^{3+}$ mole ratio; the $Fe^{2+}/Fe^{3+}$ mole ratio, the coercive force [Hc-2] and the mean length in the long axis direction are as indicated in TABLE 1) | |
| Vinyl Chloride/Vinyl Acetate Copolymer | 10 parts |
| (sulfonic acid group content: 0.25% by weight) | |
| Polyester Polyurethane | 5 parts |
| (sulfonic acid group content: 0.1% by weight) | |
| Polyisocyanate | 6 parts |
| (Coronate L manufactured by Nippon Polyurethane Co., Ltd.) | |
| Stearic Acid (for industrial use) | 1 part |
| Butyl Stearate (for industrial use) | 1 part |
| α-Alumina | 10 parts |
| (average particle size: 0.1 μm) | |
| Carbon Black | 1 part |
| (average particle size: 70 nm) | |
| Solvent | 100 parts |
| (methyl ethyl ketone/cyclohexanone = 7/3 weight ratio) | |

| Coating Solution for Lower Magnetic Layer (Solution B) | |
|---|---|
| Co-γ-FeO$_x$ | 100 parts |
| (x depends on the $Fe^{2+}/Fe^{3+}$ mole ratio; the $Fe^{2+}/Fe^{3+}$ mole ratio, the coercive force [Hc-1] and the mean length in the long axis direction are as indicated in TABLE 1) | |
| Vinyl Chloride/Vinyl Acetate Copolymer | 11 parts |
| (sulfonic acid group content: 0.25% by weight) | |
| Polyester Polyurethane | 4 parts |
| (sulfonic acid group content: 0.1% by weight) | |
| Polyisocyanate | 6 parts |
| (Coronate L manufactured by Nippon Polyurethane Co., Ltd.) | |
| Stearic Acid (for industrial use) | 1 part |
| Butyl Stearate (for industrial use) | 1 part |
| Carbon Black | 5 parts |
| (average particle size: 20 nm) | |
| Solvent | 100 parts |
| (methyl ethyl ketone/cyclohexanone = 7/3 weight ratio) | |

Each of the above compositions was dispersed by kneading with a kneader. Thus, magnetic coating solutions, Solution A and Solution B, were each obtained.

The resulting coating solutions were applied to the surface of a 14 μm-thick polyethylene terephthalate support in amounts such that the uppermost magnetic layer (Solution A) and the lower magnetic layer (Solution B) had thicknesses of 0.5 μm and 3.5 μm, respectively, after drying. Successively, the resulting coated layer was subjected to magnetic field orientation treatment, drying and supercalender treatment. Thus, samples, Nos. 1 to 36, were prepared.

On the other hand, a sample, No. 37, was prepared in the same manner as above with the exception that only Solution A was applied to thereby form a single magnetic layer having a thickness of 4.0 μm after drying.

Furthermore, a sample, No. 38, was prepared in the same manner as Example 4 of JP-A-1-220218.

The magnetic recording media thus obtained were slitted, and subjected to the following performance evaluation tests.

The coercive force (Hc) of Co-γ-FeO$_x$ was measured with VSM-3 (manufactured by Toei Kogyo Co.) in an external magnetic field of 5 KOe.

The content of $Fe^{2+}$ was measured by oxidation-reduction titration using a potassium permanganate solution. A value obtained by subtracting the amount of $Fe^{2+}$ from the total amount of iron determined by atomic absorption spectroscopy is given as the content of $Fe^{3+}$.

Furthermore, the mean length in the long axis direction was determined by observation with a transmission electron microscope.

Performance Evaluation Tests (1) Video S/N (according to No. 6-5 in the VHS video cassette system standard of JVC)

Picture signals of 50% white were recorded on each sample by standard picture recording current, and the measurement was carried out using a commercial S/N meter. The S/N is indicated in dB based on that of the standard tape (sample No. 37).

(2) Chroma S/N (according to No. 6-7 in the VHS video cassette system standard of JVC)

Color signals of picture signals were recorded on each sample by standard picture recording current, and the measurement was carried out using a commercial S/N meter. The S/N is indicated in dB based on that of the standard tape (sample No. 37).

(3) Linear Audio Frequency Characteristic (according to No. 7-4 in the VHS video cassette system standard of JVC)

Sine wave signals of 1 kHz and 10 kHz were recorded on each sample at a level 10 dB lower than the normal input level and at the normal bias. The signals were reproduced, and the reproduced output level of 1 kHz and 10 kHz was measured with a level meter. The deviation of the reproduced output level of 10 kHz to the reproduced output level of 1 kHz was determined, and the S/N is indicated in dB based on that of the standard tape (sample No. 37).

(4) Print-Throuqh (according to No. 7-8 in the VHS video cassette system standard of JVC)

A tape on which sine wave signals of 1 kHz were recorded at a level 10 dB higher than the normal input level was taken up on a reel and allowed to stand for 48 hours under an atmosphere of about 30° C. Then, the reproduced output level thereof and the maximum print-through level of a silent portion at the time that it was passed through a bandpass filter were each measured. The print-through was evaluated by the difference in level between the recorded and silent portions. The signals were recorded on the tape by the length corresponding to one revolution of the reel, and successively the silent portion was formed on the tape by the length corresponding to 10 revolutions of the reel. Then, the tape was taken up on the reel.

The VHS video cassette system standard is described in Guidelines on measurement of magnetic tape for VHS video cassette system.

The results obtained are shown in Table 1.

TABLE 1

| | Ferromagnetic Powder for Uppermost Magnetic Layer | | |
|---|---|---|---|
| Sample No. | Coercive [Hc-2] (Oe) | $Fe^{2+}/Fe^{3+}$ Mole Ratio | Mean Length in the Long Axis Direction (μm) |
| 1 | 900 | 8/100 | 0.18 |
| 2 | 900 | 14/100 | 0.18 |
| 3 | 900 | 20/100 | 0.18 |
| 4 | 900 | 25/100 | 0.18 |
| 5 | 900 | 30/100 | 0.18 |
| 6 | 900 | 40/100 | 0.18 |
| 7 | 900 | 50/10 | 0.18 |
| 8 | 900 | 25/100 | 0.18 |
| 9 | 900 | 25/100 | 0.18 |
| 10 | 900 | 25/100 | 0.18 |
| 11 | 900 | 25/100 | 0.18 |
| 12 | 900 | 25/100 | 0.18 |
| 13 | 900 | 25/100 | 0.18 |
| 14 | 600 | 25/100 | 0.18 |
| 15 | 650 | 25/100 | 0.18 |
| 16 | 700 | 25/100 | 0.18 |
| 17 | 900 | 25/100 | 0.18 |
| 18 | 1200 | 25/100 | 0.18 |
| 19 | 1300 | 25/100 | 0.18 |
| 20 | 1500 | 25/100 | 0.18 |
| 21 | 1600 | 25/100 | 0.18 |
| 22 | 900 | 25/100 | 0.18 |
| 23 | 900 | 25/100 | 0.18 |
| 24 | 900 | 25/100 | 0.18 |
| 25 | 900 | 25/100 | 0.18 |
| 26 | 900 | 25/100 | 0.05 |
| 27 | 900 | 25/100 | 0.08 |
| 28 | 900 | 25/100 | 0.10 |
| 29 | 900 | 25/100 | 0.23 |
| 30 | 900 | 25/100 | 0.25 |
| 31 | 900 | 25/100 | 0.30 |
| 32 | 900 | 25/100 | 0.18 |
| 33 | 900 | 25/100 | 0.18 |
| 34 | 900 | 25/100 | 0.18 |
| 35 | 900 | 25/100 | 0.18 |
| 36 | 900 | 25/100 | 0.18 |
| 37 | 900 | 25/100 | 0.18 |
| 38 | 900 | 6/100 | 0.17 |

| | Ferromagnetic Powder for Lower Magnetic Layer | | | |
|---|---|---|---|---|
| Sample No. | Coercive [Hc-1] (Oe) | $Fe^{2+}/Fe^{3+}$ Mole Ratio | Mean Length in the Long Axis Direction (μm) | Ratio of Coercive Force of Lower Magnetic Layer to That of Uppermost Magnetic Layer [Hc-1/Hc-2] |
| 1 | 700 | 8/100 | 0.23 | 0.78 |
| 2 | 700 | 8/100 | 0.23 | 0.78 |
| 3 | 700 | 8/100 | 0.23 | 0.78 |
| 4 | 700 | 8/100 | 0.23 | 0.78 |
| 5 | 700 | 8/100 | 0.23 | 0.78 |
| 6 | 700 | 8/100 | 0.23 | 0.78 |
| 7 | 700 | 8/100 | 0.23 | 0.78 |
| 8 | 700 | 4/100 | 0.23 | 0.78 |
| 9 | 700 | 10/100 | 0.23 | 0.78 |
| 10 | 700 | 14/100 | 0.23 | 0.78 |
| 11 | 700 | 18/100 | 0.23 | 0.78 |
| 12 | 700 | 20/100 | 0.23 | 0.78 |
| 13 | 700 | 25/100 | 0.23 | 0.78 |
| 14 | 700 | 8/100 | 0.23 | 1.17 |
| 15 | 650 | 8/100 | 0.23 | 1.00 |
| 16 | 700 | 8/100 | 0.23 | 1.00 |
| 17 | 700 | 8/100 | 0.23 | 0.78 |
| 18 | 900 | 8/100 | 0.23 | 0.75 |
| 19 | 900 | 8/100 | 0.23 | 0.69 |
| 20 | 900 | 8/100 | 0.23 | 0.60 |
| 21 | 900 | 8/100 | 0.23 | 0.56 |
| 22 | 500 | 8/100 | 0.23 | 0.56 |
| 23 | 600 | 8/100 | 0.23 | 0.67 |
| 24 | 900 | 8/100 | 0.23 | 1.00 |
| 25 | 1000 | 8/100 | 0.23 | 1.10 |
| 26 | 700 | 8/100 | 0.23 | 0.78 |
| 27 | 700 | 8/100 | 0.23 | 0.78 |
| 28 | 700 | 8/100 | 0.23 | 0.78 |
| 29 | 700 | 8/100 | 0.23 | 0.78 |
| 30 | 700 | 8/100 | 0.23 | 0.78 |
| 31 | 700 | 8/100 | 0.23 | 0.78 |
| 32 | 700 | 8/100 | 0.10 | 0.78 |
| 33 | 700 | 8/100 | 0.15 | 0.78 |
| 34 | 700 | 8/100 | 0.20 | 0.78 |
| 35 | 700 | 8/100 | 0.25 | 0.78 |
| 36 | 700 | 8/100 | 0.30 | 0.78 |
| 37 | — | — | — | — |
| 38 | 410 | 2.3/100 | 0.30 | 0.60 |

TABLE 1-continued

Performance Evaluation

| Sample No. | Video S/N (dB) | Chroma S/N (dB) | Linear Audio Frequency Characteristic (dB) | Print-Through (dB) | Remarks |
|---|---|---|---|---|---|
| 1 | 0.0 | 0.5 | 2.8 | 57 | Comparison |
| 2 | 0.5 | 1.0 | 2.9 | 57 | Comparison |
| 3 | 2.3 | 2.8 | 3.0 | 56 | Invention |
| 4 | 2.5 | 3.0 | 3.0 | 56 | Invention |
| 5 | 3.0 | 3.5 | 3.1 | 56 | Invention |
| 6 | 3.3 | 3.8 | 3.1 | 55 | Invention |
| 7 | 3.5 | 4.0 | 3.2 | 55 | Invention |
| 8 | 2.5 | 2.7 | 2.9 | 58 | Invention |
| 9 | 2.5 | 2.9 | 3.0 | 55 | Invention |
| 10 | 2.5 | 3.2 | 3.1 | 53 | Invention |
| 11 | 2.5 | 3.3 | 3.1 | 50 | Invention |
| 12 | 2.5 | 3.4 | 3.1 | 45 | Comparison |
| 13 | 2.5 | 3.5 | 3.1 | 42 | Comparison |
| 14 | 0.0 | 3.5 | 2.0 | 54 | Comparison |
| 15 | 1.8 | 3.5 | 2.5 | 53 | Invention |
| 16 | 2.0 | 3.2 | 2.5 | 55 | Invention |
| 17 | 2.5 | 3.0 | 3.0 | 56 | Invention |
| 18 | 3.0 | 2.5 | 3.2 | 57 | Invention |
| 19 | 3.2 | 2.4 | 3.3 | 58 | Invention |
| 20 | 3.5 | 2.2 | 3.4 | 58 | Invention |
| 21 | 2.5 | 1.0 | 3.4 | 58 | Comparison |
| 22 | 2.5 | 4.0 | 0.0 | 53 | Comparison |
| 23 | 2.5 | 3.5 | 2.0 | 54 | Invention |
| 24 | 2.5 | 2.5 | 3.5 | 57 | Invention |
| 25 | 2.5 | 1.0 | 3.8 | 58 | Comparison |
| 26 | 1.0 | 1.5 | 3.0 | 56 | Invention |
| 27 | 2.0 | 2.5 | 3.0 | 56 | Invention |
| 28 | 2.5 | 3.0 | 3.0 | 56 | Invention |
| 29 | 2.0 | 2.5 | 3.0 | 56 | Invention |
| 30 | 1.5 | 2.0 | 3.0 | 56 | Invention |
| 31 | 1.0 | 1.5 | 3.0 | 56 | Invention |
| 32 | 2.0 | 1.5 | 2.0 | 54 | Invention |
| 33 | 2.5 | 2.0 | 2.5 | 55 | Invention |
| 34 | 3.0 | 3.5 | 3.0 | 56 | Invention |
| 35 | 2.0 | 2.0 | 3.0 | 57 | Invention |
| 36 | 1.0 | 1.5 | 3.0 | 58 | Invention |
| 37 | 0.0 | 0.0 | 0.0 | 57 | Standard |
| 38 | -1.5 | -1.0 | -1.0 | 50 | Comparison |

Sample No. 38 corresponds to Example 4 of JP-A-1-220218.

As is apparent from the results of sample Nos. 1 to 7 shown in Table 1, it is considered that the video output and the chroma output are improved, and the video S/N and the chroma S/N are also improved, as the ferromagnetic powder of the uppermost magnetic layers having a higher $Fe^{2+}/Fe^{3+}$ mole ratio is progressively increased in saturation magnetization (cs).

As is apparent from the results of sample Nos. 4 and 8 to 13 shown in Table 1, the $Fe^{2+}/Fe^{3+}$ mole ratio of the ferromagnetic powder of the lower magnetic layer must be less than 20/100 to compensate for the print-through characteristics of the uppermost magnetic layer.

As is apparent from the results of sample Nos. 14 to 21 shown in Table 1, when the coercive force [Hc-2] of the uppermost magnetic layer is increased to vary the coercive force ratio [Hc-1/Hc-2] of the lower magnetic layer to the uppermost magnetic layer, the video S/N (i.e., an electromagnetic characteristic in the short wavelength region) is improved. However, when the coercive force [Hc-2] exceeds 1,500 Oe, sufficient recording on the magnetic recording head is not obtained to thereby deteriorate the video S/N.

As is apparent from the results of sample Nos. 17 and 22 to 25 shown in Table 1, the chroma output (i.e., an electromagnetic characteristic in the long wavelength region) is improved and the chroma S/N is also improved, as the coercive force [Hc-1] of the lower magnetic layer is decreased. However, if the coercive force [Hc-1] of the lower magnetic layer is decreased too much, the linear audio frequency characteristics are deteriorated.

As is apparent from the results of sample Nos. 14 to 25 described above, the coercive force ratio [Hc-1/Hc-2] of the lower magnetic layer to the uppermost magnetic layer is specified to be within the range of 0.6 to 1.0 to satisfy all of the video S/N, the chroma S/N and the linear audio frequency characteristics.

As is apparent from the results of sample Nos. 26 to 31, when the particle size of the uppermost magnetic layer is decreased, the noise is reduced, and the video S/N and the chroma S/N are improved. And, when the particle size is increased to 0.06 μm or more, more sufficient dispersion is obtained, reduction of the packing density (i.e., the filling degree) and the squareness ratio are prevented and decrease of the video S/N and the chroma S/N are prevented.

As is apparent from the results of sample Nos. 32 to 36, when the particle size of the lower magnetic layer is too large, the surface of the magnetic layer is roughened to thereby increase the noise and reduce the video S/N and the chroma S/N. However, when the particle size is too small, sufficient dispersion is not be obtained, and the surface of the magnetic layer is similarly roughened to reduce the video S/N and the chroma S/N.

A sample, No. 38, prepared according to Example 4 of JP-A-1-220218 has a low $Fe^{2+}/Fe^{3+}$ mole ratio of the uppermost layer, such that the residual magnetic flux density is decreased, and the video S/N and the chroma S/N are significantly deteriorated. This sample is therefore unsuitable as a magnetic recording medium for video use.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least two magnetic layers, wherein said at least two magnetic layers comprise a ferromagnetic powder and a binder resin; the uppermost magnetic layer arranged farthest from the support contains a cobalt-containing iron oxide powder having an $Fe^{2+}/Fe^{3+}$ mole ratio of 20/100 to 50/100 and a coercive force of 650 to 1,500 Oe; and at least one of said magnetic layers is a lower magnetic layer in contact with said uppermost magnetic layer and contains a cobalt-containing iron oxide powder having an $Fe^{2+}/Fe^{3+}$ mole ratio of less than 20/100 and a coercive force of 0.6 to 1.0 times that of the cobalt-containing iron oxide powder contained in the uppermost magnetic layer.

2. A magnetic recording medium as in claim 1, wherein the cobalt-containing iron oxide powders contained in each of the uppermost magnetic layer and the lower magnetic layer have a mean length in the long axis direction of from 0.06 to 0.25 μm, and the cobalt-containing iron oxide powder contained in the lower magnetic layer has a mean length in the long axis direction larger than that of the cobalt-containing iron oxide powder contained in the uppermost magnetic layer.

3. A magnetic recording medium as in claim 1, wherein the dry thickness of the lower magnetic layer is at least 2 μm.

4. A magnetic recording medium as in claim 1, wherein the cobalt-containing iron oxide powder of the uppermost magnetic layer has an $Fe^{2+}/Fe^{3+}$ mol ratio of from 25/100 to 35/100.

5. A magnetic recording medium as in claim 1, wherein the cobalt-containing iron oxide powder of the uppermost magnetic layer has a coercive force of from 750 to 950 Oe.

6. A magnetic recording medium as in claim 1, wherein the cobalt-containing iron oxide powder of the lower magnetic layer has an $Fe^{2+}/Fe^{3+}$ mol ratio of from 5/100 to 10/100.

7. A magnetic recording medium as in claim 1, wherein the cobalt-containing iron oxide powder of the lower magnetic layer has a coercive force of from 0.8 to 1.0 times that of the cobalt-containing iron oxide powder of the uppermost magnetic layer.

8. A magnetic recording medium as in claim 1, wherein the cobalt-containing iron oxide powder of the lower magnetic layer has a coercive force of from 600 to 850 Oe.

9. A magnetic recording medium as in claim 1, wherein the cobalt-containing iron oxide powder of the uppermost magnetic layer has a crystalline size of less than 500 Å.

10. A magnetic recording medium as in claim 1, wherein the cobalt-containing iron oxide powder of the lower magnetic layer has a crystalline size of 500 Å or less, with the proviso that the crystalline size is larger than that of the cobalt-containing iron oxide powder of the uppermost magnetic layer.

11. A magnetic recording medium as in claim 1, wherein the uppermost magnetic layer has a thickness of from 0.1 to 1.5 μm.

12. A magnetic recording medium as in claim 1, wherein the lower magnetic layer has a thickness of from 2.0 to 6.0 μm.

13. A method for recording video and audio signals having both good reproduced video output and print-through characteristics, comprising the steps of passing a magnetic recording medium through the fringing field above the gap of a magnetic head, said magnetic recording medium comprising a non-magnetic support having provided thereon at least two magnetic layers, said at least two magnetic layers containing a ferromagnetic powder and a binder resin, the uppermost magnetic layer arranged farthest from the support contains a cobalt-containing iron oxide powder having an $Fe^{2+}/Fe^{3+}$ mole ratio of 20/100 to 50/100 and a coercive force of 650 to 1,500 Oe, and at least one of said magnetic layers is a lower magnetic layer in contact with said uppermost magnetic layer and contains a cobalt-containing iron oxide powder having an $Fe^{2+}/Fe^{3+}$ mole ratio of less than 20/100 and a coercive force of 0.6 to 1.0 times that of the cobalt-containing iron oxide powder contained in the uppermost magnetic layer.

* * * * *